ical Patent [19] [11] 3,810,690
Klein et al. [45] May 14, 1974

[54] REMOTELY CONTROLLED DAY-NIGHT REAR VIEW MIRROR

[75] Inventors: Donald R. Klein, Union City, Ind.; Fredrick C. Read, Greenville, Ohio

[73] Assignee: Sheller-Globe Corporation, Toledo, Ohio

[22] Filed: May 17, 1972

[21] Appl. No.: 254,265

[52] U.S. Cl. .............................. 350/282, 74/501 M
[51] Int. Cl. ........................... B60r 1/06, G02b 7/18
[58] Field of Search........... 350/281, 282; 74/501 M

[56] References Cited
UNITED STATES PATENTS
3,650,606  3/1972  Van Noord ........................ 350/282

Primary Examiner—John K. Corbin
Attorney, Agent, or Firm—Basil C. Foussianes

[57] ABSTRACT

A remotely controlled day-night rear view mirror wherein the mirror can be reversed for day-night use and adjusted for varying driver positions comprising a housing or shell, a bezel pivotally mounted about a first axis in the shell and a reversible mirror mounted in the bezel about a second axis. A single externally mounted and manually operated lever manipulates the mirror through cables.

24 Claims, 15 Drawing Figures

REMOTELY CONTROLLED DAY-NIGHT REAR VIEW MIRROR

This invention relates to remotely controlled day-night rear view mirrors.

BACKGROUND OF THE INVENTION

In the patent to Andrew J. Van Noord No. 3,650,606 issued Mar. 21, 1972, there is disclosed a remotely controlled day-night rear view mirror wherein a mirror having opposed mirror surfaces is mounted for presentation of one or the other of the surfaces to the driver and for adjustment by a single control.

Among the objects of the invention are to provide an improved remotely controlled day-night rear view mirror wherein novel pivoted bearing constructions are provided to facilitate free and unemcumbered movement and adjustment; wherein the positioning of the mirror is accurately controlled in all directions; wherein novel actuator means are provided; and wherein there is a minimum likelihood of malfunction.

DESCRIPTION

Figure 1:
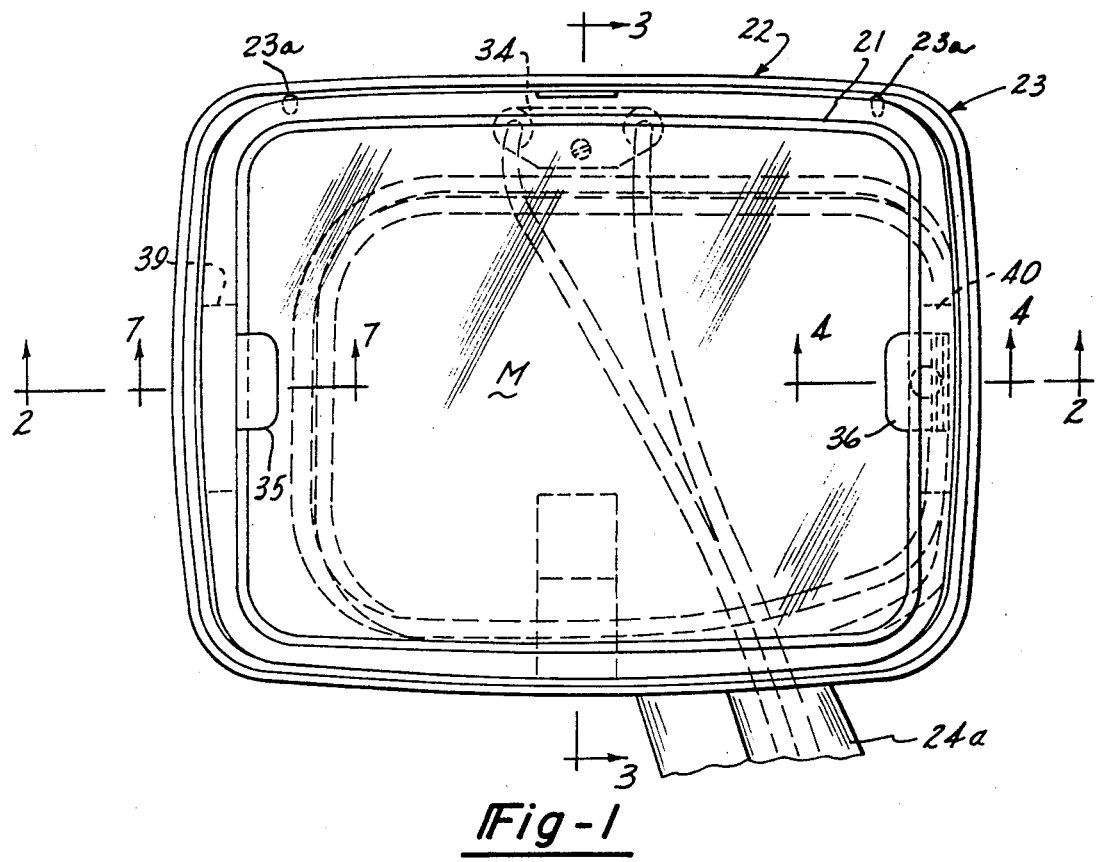
FIG. 1 is a front elevational view of a remotely controlled day-night rear view mirror embodying the invention.
Figure 2:
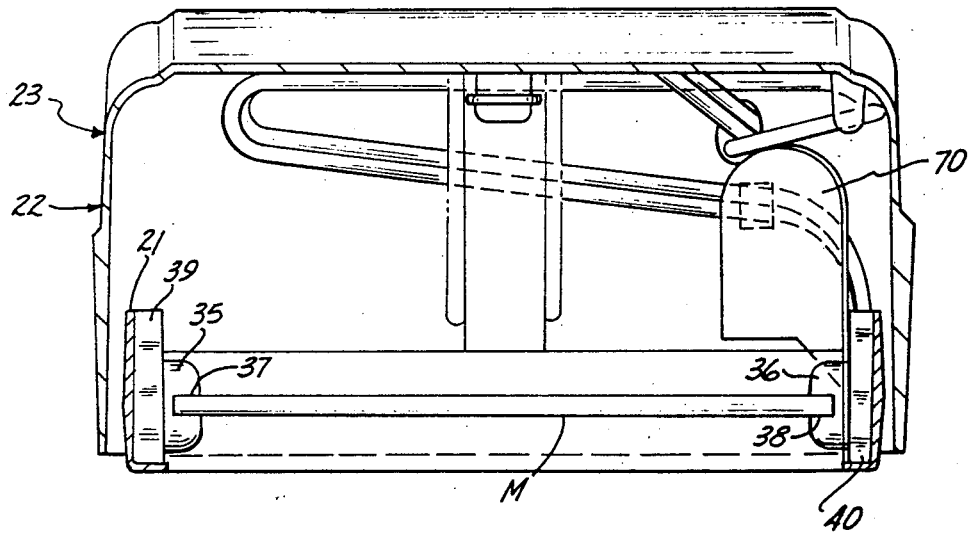
FIG. 2 is a sectional view taken along the line 2—2 in FIG. 1.

Referring to FIG. 1, the remotely controlled day-night rear view mirror 22 embodying the invention comprises a mirror M mounted on a suitable support with a peripheral frame if desired which is pivoted, as presently described, in a bezel 21 surrounding the mirror. The bezel 21 is in turn pivoted about a vertical axis in a shell 23 that surrounds the bezel and is fixed to a base or a stanchion 24a attached to the automotive vehicle or the like. Positive stops 23a on shell 23 limit the pivotal movement of bezel.

Figure 3:
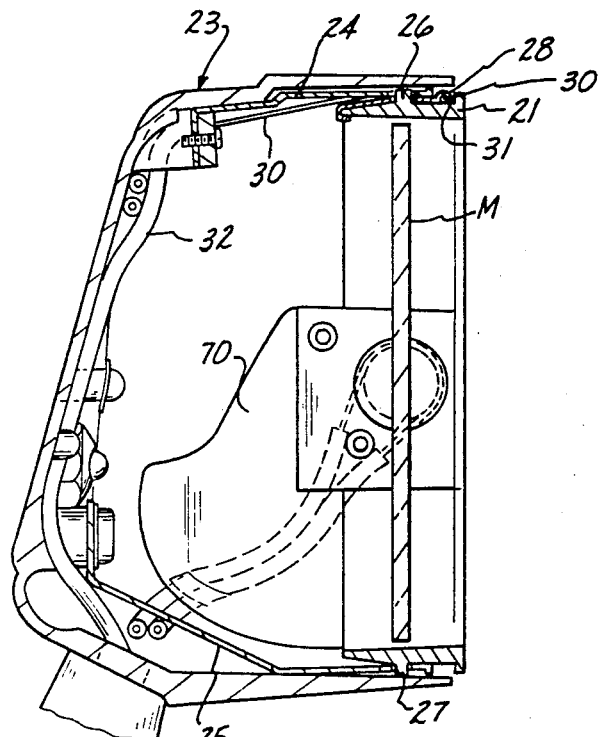
FIG. 3 is a sectional view taken along the line 3—3 in FIG. 1.

A single remote control assembly, as presently described, functions to pivot the mirror in excess of 180° within the bezel 21 to present one or the other of the opposed surfaces of the mirror to the driver in the proper attitude to the driver and to provide minute adjustments from the vertical plane as required. One of the surfaces is intended for day time use and the other is for night time use in accordance with well-known optical principles for minimizing glare. The single remote control assembly further functions to provide pivotal adjustment of the bezel 21 about the vertical axis to accommodate various driver eye positions, as presently described. Referring to FIG. 3, the bezel 21 is pivoted within the shell 23 by upper and lower metal brackets 24, 25 that are fixed to the inner surface of the rear of the shell 23 and project axially toward the open end of the shell. The bezel includes integral pivots 26, 27 that engage openings in the brackets or spring arms 24, 25 to thereby pivot the bezel 21 about a vertical axis.

Figure 8:
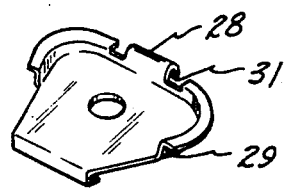
FIG. 8 is a perspective view of a part of the structure shown in FIG. 3.

Referring to FIG. 8, a pulley bracket 28 is fixed to the bezel 21 and rotates therewith adjacent the upper pivot bracket 24. The pulley bracket 28 has a peripheral groove or shoulder 29 over which a cable 30 is trained. Tab 31 on the bracket 28 is bent over to grip the cable 30. The cable 30 thus defines two portions or a pair of cables 30a, 30b that extend into sheaths 32. One end of each sheath 32 engages shoulders in recess 33 in a bracket member 34 on shell 23 and the other end of each sheath extends through the stanchion 24 to the remote control mechanism, as presently described.

Referring to FIGS. 1, 2, 4 and 5, the means for pivoting the mirror M on the bezel 21 comprises spaced pivot members 35, 36 of plastic which have grooves 37, 38 therein for receiving the mirror. The pivot members 35, 36 have cylindrical peripheral surfaces and extend into complementary cylindrical recesses in bearing members 39, 40 that are fixed on the inner surface of the bezel 21.

Figure 4:
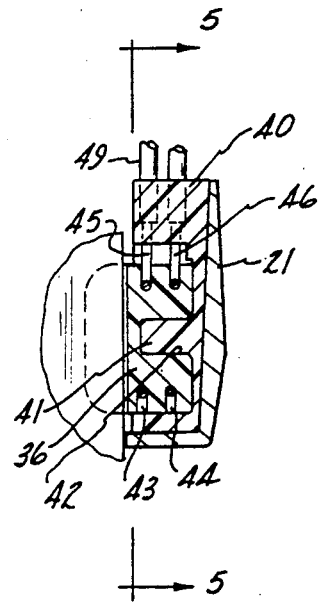
FIG. 4 is a fragmentary sectional view on an enlarged scale taken along the line 4—4 in FIG. 1.
Figure 5:
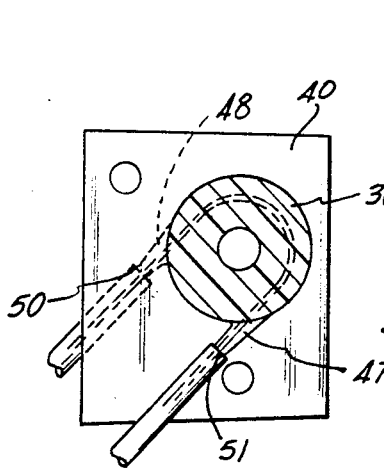
FIG. 5 is a fragmentary sectional view taken along the line 5—5 in FIG. 4.
Figure 6:
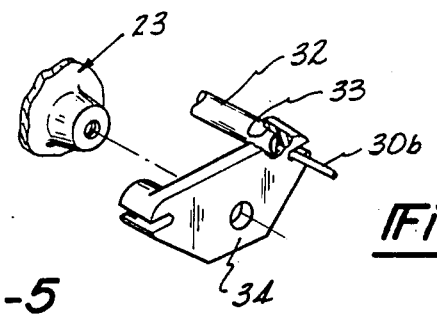
FIG. 6 is a fragmentary perspective view of a portion of the mirror construction.
Figure 7:
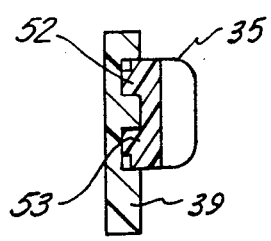
FIG. 7 is a fragmentary sectional view taken along the line 7—7 in FIG. 1.

As shown in FIG. 4, bearing member 40 includes an axial projection 41 that extends into a recess 42 of the pivot member 36. The pivot member 36 further includes two peripheral grooves 43, 44 onto which another pair of cables comprising second and third cables 45, 46 are wound with the ends of the cables fastened to the pivot 36 as shown. The ferruled ends of the cables are staggered circumferentially of one another so that each cable is never completely unwound from its groove. In this manner a portion of each cable is always in contact with the pulley so that flexing of the cable strands at the ferrule is prevented. Tangential passageways 47, 48 are provided in the bearing member 40 through which the cables 45, 46 extend. Sheaths 49 surround the major portion of the cables 45, 46 and the ends of the sheaths engage shoulders 50, 51 in the passages 47, 48. The cables 45, 46 extend to the remote control, as presently described.

The pivot member 35 at the other side of the mirror M includes annular projections 52, 53 that engage a fixed projection on bearing member 39 and function to limit the swinging movement of the mirror so that the mirror is positively positioned in one or the other of its two extreme positions for day or night use and a portion of each cable remains in its groove on pulley 36 to prevent flexing of its ends as indicated above.

Referring to FIGS. 9–12, the remote control assembly to which the cables extend comprises a bracket 55 that is adapted to be fixed to another portion of the vehicle. The bracket 55 includes an arcuate generally cylindrical slot 56 with a flat base and tapered slots in which a first swivel arm 57 is mounted for pivotal movement about a first axis. A second swivel arm 58 is pivoted by a pin 59 or other suitable journal for pivotal movement about an axis at a right angle to the axis of movement of the swivel arm 57. The cables 30a, 30b forming portions of cable 30 extend to the ends of the swivel arm 57 while the cables 45, 46 extend to the ends of the swivel arm 58 and all the cables are under tension. A single control lever 60 is fixed to the swivel arm 58 so that by swinging the lever 60 with respect to the swivel arm 57, the mirror M is pivoted or flipped between the day and night positions and by swinging the lever 60 in the other direction, the mirror M is adjusted by rotation of the bezel 21. By this arrangement, the horizontal adjustment and flipping of the mirror between day and night positions can be achieved independently of one another.

Figure 9:
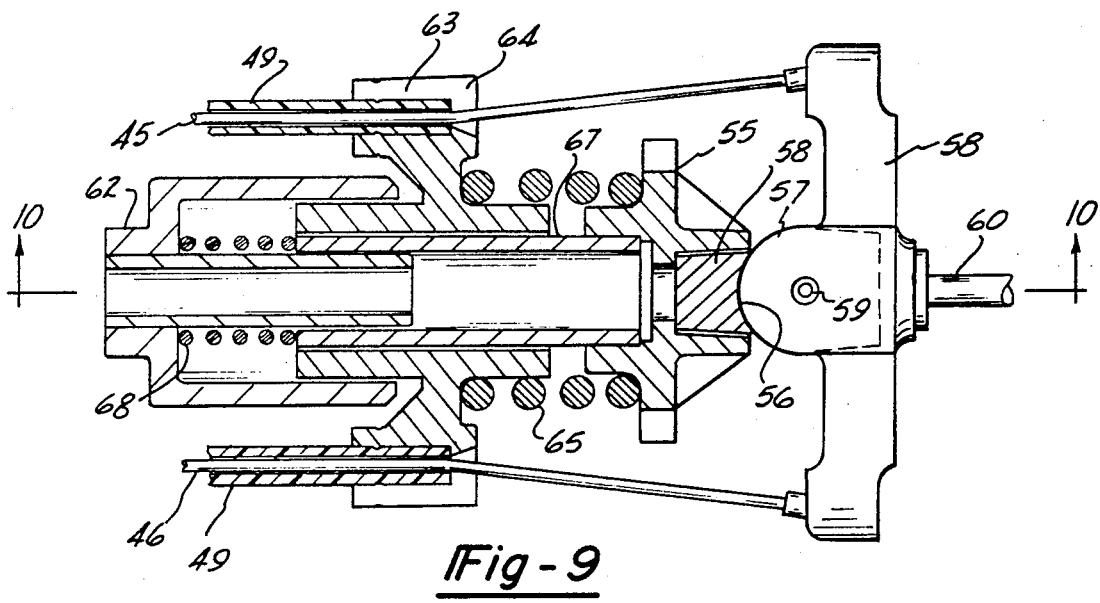
FIG. 9 is a longitudinal sectional view through the remotely controlled assembly.
Figure 10:
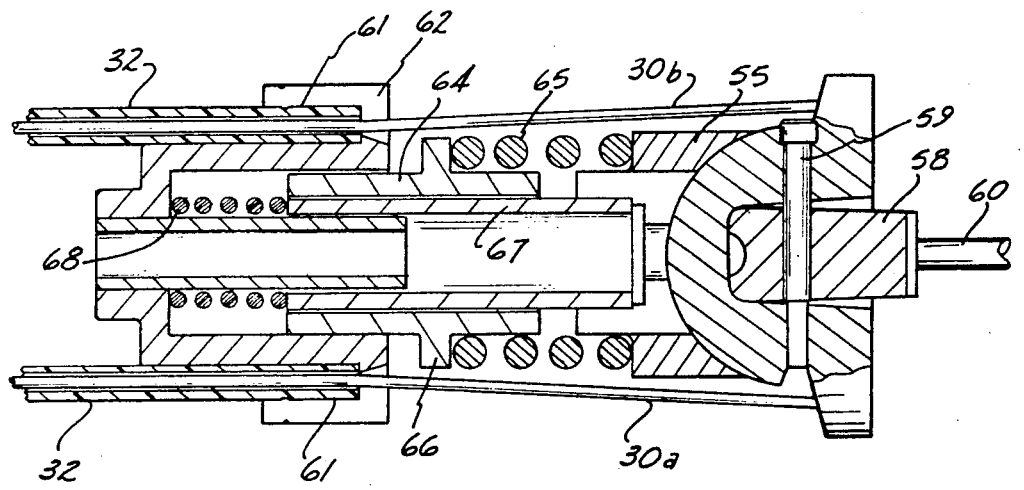
FIG. 10 is a fragmentary sectional view taken along the line 10—10 in FIG. 9.
Figure 11:
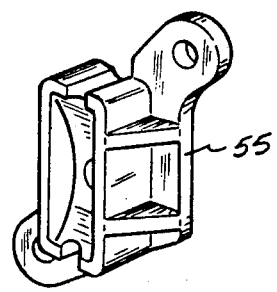
FIG. 11 is a perspective view of a part of the structure shown in FIGS. 9 and 10.
Figure 12:
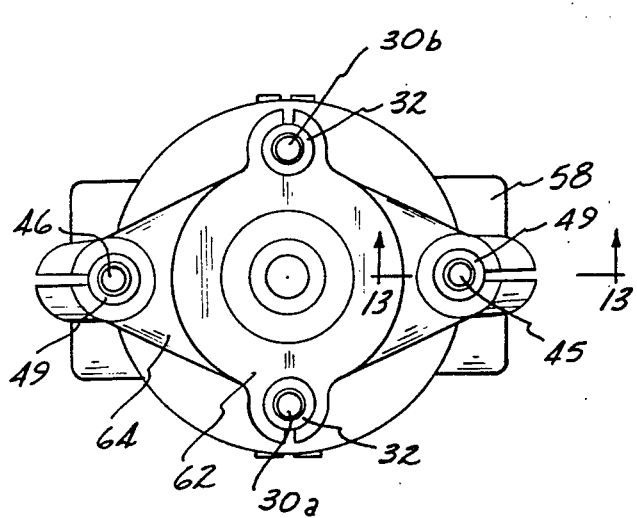
FIG. 12 is an end view taken from the right in FIG. 9.
Figure 13:
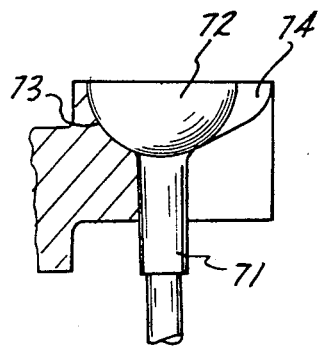
FIG. 13 is a fragmentary sectional view taken along the line 13—13 in FIG. 12 on an enlarged scale.
Figure 14:
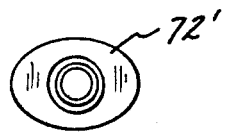
FIG. 14 is a fragmentary plan view of a modified portion of the structure shown in FIG. 13.
Figure 15:
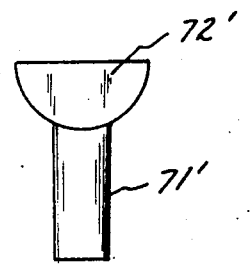
FIG. 15 is an elevational view of the portion of the structure shown in FIG. 14.

Referring to FIGS. 9 and 10, the sheaths 32 on the other ends of the cables extend into recesses 61 of a retainer 62 while the sheaths 49 extend into recesses 63 of a retainer 64, the retainers 62, 64 being telescoped within one another.

A helical compression spring 65 is interposed between the bracket 55 and a flange 66 on retainer 64. A tube 67 extends between the bracket 55 through the retainer 64 and a helical compression spring 68 is interposed between the end of the tube 67 and the retainer 62. In this manner the cable sheaths are compressed to minimize binding action, the sheaths 49 being compressed between the retainer 64 and the bearing member 40 while the sheaths 32 are compressed between the retainer 62 and the bracket member 34.

In order to facilitate the horizontal adjustment of the bezel and, in turn, the mirror on the vertical pivots 26, 27, the cable sheaths 49 and, in turn, the cables therein are provided in a loop at the rear of the shell and maintained in this position by a cable retainer 70. A direct routing of the cable sheaths 49 would result in a spring effect against the bezel, causing the bezel to pivot in a direction away from the force of the cable sheaths. This imposes an unbalanced force at the actuator so that more effort would be required in one direction than another.

Referring to FIGS. 12-15, in order to prevent twisting or untwisting of the cables with resultant loss of control, the ends of the cables are fixed to the retainers by retainer members 71 of zinc or brass which are crimped to the ends of the cable. The ends of the retainer members as at 72 are enlarged to engage complementary recesses 73 in the appropriate retainer. During the deformation or prior thereto, portions 74 are provided on the enlarged end 72 so that the end is not symmetrical in all planes. These portions engage grooves or other portions of the recess 73 to prevent rotation of the cable. In the modified form shown in FIGS. 14 and 15, the enlarged ends 72' form portions of a developed unsymmetrical sphere so that the retainer members 71' will not rotate with respect to the retainers.

In operation, manipulation of the single control 60 in one direction will cause the mirror M to pivot about the horizontal axis, assume either the day or night position, and manipulation of the single control 60 in the other direction will adjust the mirror M about the vertical axis by pivoting the bezel 21.

We claim:

1. In a remotely controlled day-night rear view mirror, the combination comprising a mirror having day-night mirror surfaces on opposed sides thereof, a bezel, a base, means for pivoting said bezel to said base about a first axis, means for pivoting said mirror to said bezel about a second axis at an angle to said first axis, said means for pivoting said bezel to said base comprising pivot brackets on said base and pivot members on said bezel engaging said brackets, a pulley fixed to said bezel about which a first cable is wound, means for fixing said cable to said pulley such that portions of said cable extend from said pulley, said means for pivoting said mirror to said bezel comprising spaced bearings on said bezel, spaced pivots mounted and fixed to said mirror and engaging said bearings, one of said pivots comprising spaced peripheral grooves, a pair of cables engaging said grooves and fixed to said pivot, the other of said bearing and pivot having interengaging means for limiting the positions of said day-night mirror such that the mirror can be rotated 180° to present one or the other of the mirror surfaces, and a mirror control assembly comprising a bracket adapted to be fixed in position with relation to the base, a first swivel arm mounted for pivotal movement about a first axis with respect to said bracket, a second swivel arm mounted for pivotal movement about a second axis with respect to said bracket on said first swivel arm, said first swivel arm having spaced portions to which the ends of said first-mentioned cable are fastened, said second swivel arm having spaced portions to which said second and third cables are fastened and an actuator lever fixed to said first swivel arm whereby movement of the actuator lever in one plane will cause pivotal movement of the mirror through said first-mentioned cable by pivoting of the bezel and swinging movement of the lever in the other plane will cause the mirror to be rotated to expose one or the other of the mirror surfaces, cable sheaths encircling the major portion of each of said cables, a bracket mounted on said base to which the ends of the cable sheaths that encircle the two portions of the first cable extend, said bearing in which said pivot on said bezel is mounted having spaced portions into which the cable sheaths encircling the second and third cables extend, and means for applying a compressive force to said sheaths comprising a first retainer having recesses therein engaging the other ends of said pair of sheaths on said first cable, a second retainer having recesses therein engaging the other ends of said sheaths encasing said second and third cables, and said spring means interposed between said bracket and each of said retainers for applying a compressive force to said sheaths.

2. The combination set forth in claim 1 wherein said pivot brackets for pivotally supporting said bezel comprise spring arms.

3. The combination set forth in claim 1 wherein said base comprises a shell surrounding said bezel and defining a space rearwardly thereof, said pivot members for rotatably supporting said bezel comprising spring arms fixed to said shell and projecting axially thereof.

4. The combination set forth in claim 1 wherein said means for fixing said first cable to said pulley comprises portions of said pulley deformed into engagement with said first cable.

5. The combination set forth in claim 1 wherein said bearing for rotatably supporting said mirror in said bezel comprises a generally cylindrical opening in said bearing member, said pivot having a complementary peripheral surface engaging said opening.

6. The combination set forth in claim 5 wherein said spaced portions in said bearing for engaging said sheaths comprise openings extending tangentially to said cylindrical opening, said opening having shoulders spaced from the periphery of said cylindrical opening which are engaged by said sheaths of said second and third cables.

7. The combination set forth in claim 1 wherein said cables are attached to said bearing member at circumferentially spaced points.

8. The combination set forth in claim 1 wherein said interengaging portions which define a stop between the bezel and mirror comprise interengaging arcuate projections on the other bearing and pivot.

9. The combination set forth in claim 1 wherein said means for connecting said cables to said swivel arms comprise enlargements on the end of said cables and complementary recesses on said swivel arms, said enlargements and said recesses having an unsymmetrical configuration such that the cables are prevented from rotation.

10. The combination set forth in claim 1 wherein said base includes cable-locating means for guiding the cable sheath encircling the second and third cable in a loop of substantially exceeding 270° before terminating at said bearing.

11. The combination set forth in claim 1 wherein said retainers are mounted in telescoping relation to one another, said spring means comprising a spring interposed between said bracket and one said retainer, and spring means including a tubular extension extending between said bracket and a spring between said tubular extension and said other retainer.

12. In a remotely controlled day-night rear view mirror, the combination comprising a mirror having day-night mirror surfaces on opposed sides thereof, a bezel, a base, means for pivoting said bezel to said base about a first axis, means for pivoting said mirror to said bezel about a second axis at an angle to said first axis, said means for pivoting said bezel to said base comprising pivot brackets on said base and pivot members on said bezel engaging said bracket, a pulley fixed to said bezel about which a first cable is wound, means for fixing said cable to said pulley such that portions of said cable extend from said pulley, cables fixed to said mirror, and a mirror control assembly connected to said cables comprising a bracket adapted to be fixed in position with relation to the base and including an actuator lever such that movement of the actuator lever in one plane will cause pivotal movement of the mirror by pivoting of the bezel and swinging movement of the lever in the other plane will cause the mirror to be rotated to expose one or the other of the mirror surfaces.

13. The combination set forth in claim 12 wherein said pivot brackets for pivotally supporting said bezel comprise spring arms.

14. The combination set forth in claim 12 wherein said base comprises a shell surrounding said bezel and defining a space rearwardly thereof, said pivot members for rotatably supporting said bezel comprising spring arms fixed to said shell and projecting axially thereof.

15. The combination set forth in claim 12 wherein said means for fixing said cable to said pulley comprises portions of said pulley deformed into engagement with said cable.

16. In a remotely controlled day-night rear view mirror, the combination comprising a mirror having day-night mirror surfaces on opposed sides thereof, a bezel, a base, means including a first pair of cables for pivoting said bezel to said base about a first axis, means including a second pair of cables for pivoting said mirror to said bezel about a second axis at an angle to said first axis, and a mirror control assembly comprising a bracket adapted to be fixed in position with relation to the base, a first swivel arm mounted for pivotal movement about a first axis with respect to said bracket, a second swivel arm mounted for pivotal movement about a second axis with respect to said bracket on said first swivel arm, said first swivel arm having spaced portions to which the ends of said first pair of cables are fastened, said second swivel arm having spaced portions to which said second pair of cables are fastened, and an actuator lever fixed to said first swivel arm whereby movement of the actuator lever in one plane will cause pivotal movement of the mirror through said first-mentioned cable by pivoting of the bezel and swinging movement of the lever in the other plane will cause the mirror to be rotated to expose one of the other of the mirror surfaces, cable sheaths encircling the major portions of each of said cables, a bracket mounted on said base to which the ends of the cable sheaths that encircle the first pair of cables extends, said means for pivoting said mirror to said bezel comprising a bearing member in which said pivot on said bezel is mounted having spaced portions into which the cable sheaths encircling the second pair of cables extend, and means for applying a compressive force to said sheaths comprising a first retainer having recesses therein engaging the other ends of said pair of sheaths on said first pair of cables, a second retainer having recesses therein engaging the other ends of said sheaths encasing said second pair of cables, and spring means interposed between said bracket and each of said retainers for applying a compressive force to said sheaths.

17. The combination set forth in claim 16 wherein said retainers are mounted in telescoping relation to one another, said spring means comprising a spring interposed between said bracket and one said retainer, and spring means including a tubular extension extending between said bracket and a spring between said tubular extension and said other retainer.

18. The combination set forth in claim 16 wherein said means for connecting said cables to said swivel arms comprise enlargements on the end of said cables and complementary recesses on said swivel arms, said enlargements and said recesses having an unsymmetrical configuration such that the cables are prevented from rotation.

19. In a remotely controlled day-night rear view mirror, the combination comprising a mirror having day-night mirror surfaces on opposed sides thereof, a bezel, a base, means including a first pair of cables for pivoting said bezel to said base about a first axis, means including a second pair of cables for pivoting said mirror to said bezel about a second axis at an angle to said first axis, said means for pivoting said mirror to said bezel comprising spaced bearings on said bezel, spaced pivot members mounted and fixed to said mirror and engaging said bearings, one of said pivot members comprising spaced peripheral grooves, said second pair of cables engaging said grooves and having their ends fixed to said pivot members, the other of said bearing and pivot member having interengaging means for limiting the positions of said day-night mirror such that the mirror can be rotated 180° to present one or the other of the mirror surfaces, and a mirror control assembly comprising a bracket adapted to be fixed in position with relation to the base and including an actuator lever operatively connected to said cables such that movement of the actuator lever in one plane will cause pivotal movement of the mirror by pivoting of the bezel and swinging movement of the lever in the other plane will cause the mirror to be rotated to expose one or the other of the mirror surfaces.

20. The combination set forth in claim 19 wherein said bearing in which said pivot on said bezel is mounted has spaced portions into which cable sheaths encircling the pair of cables extend.

21. The combination set forth in claim 19 wherein said bearing for rotatably supporting said mirror in said bezel comprises a generally cylindrical opening in said bearing, said pivot member having a complementary peripheral surface engaging said opening.

22. The combination set forth in claim 21 wherein said cables are attached to said pivot member at peripherally spaced points adjacent said grooves.

23. The combination set forth in claim 21 wherein said bearing comprises openings extending tangentially to said cylindrical opening, said openings having shoulders spaced from the periphery of said cylindrical opening, said cable sheaths surrounding said cables, one end of said sheaths engaging said shoulders.

24. The combination set forth in claim 19 wherein said interengaging portions defining a stop comprise arcuate projections.

* * * * *